Nov. 18, 1952  R. F. WEIL  2,618,078
EDUCATIONAL DEVICE
Filed March 11, 1947
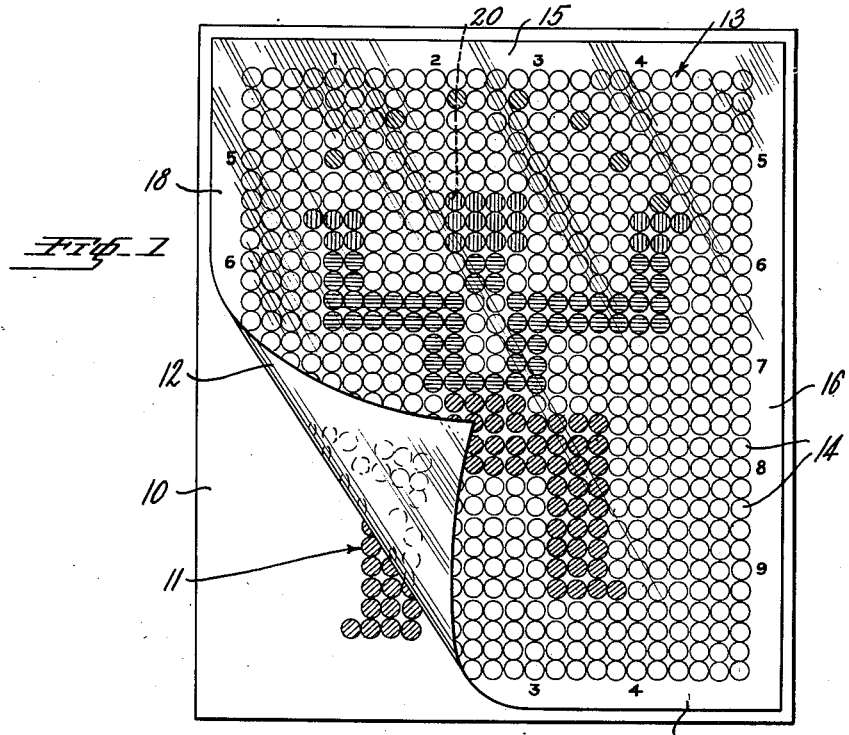
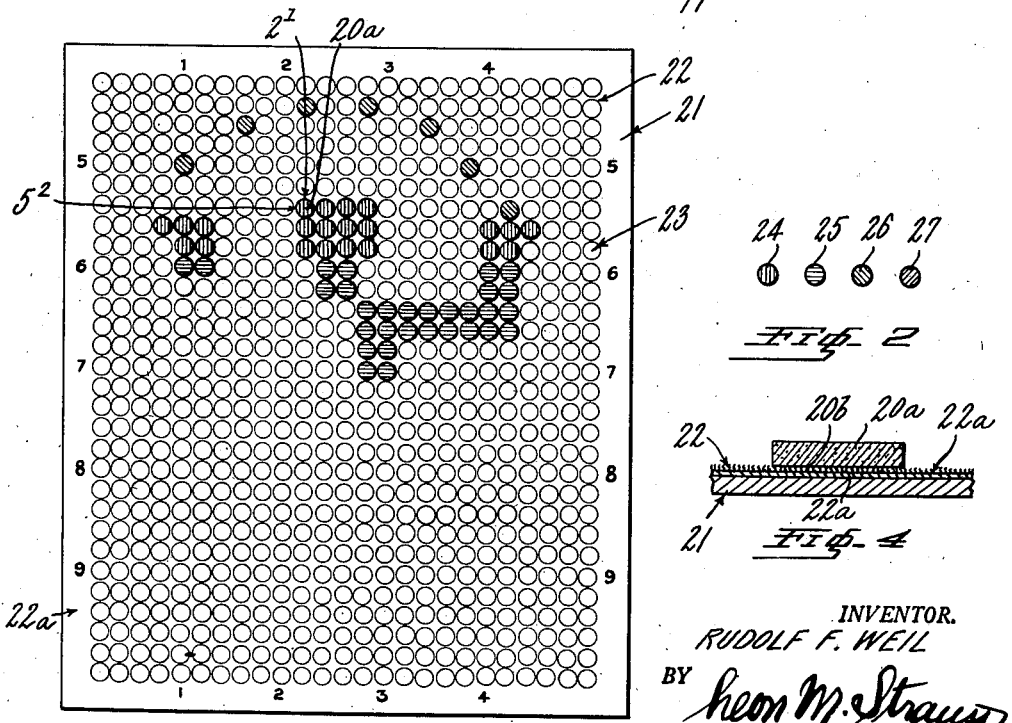
INVENTOR.
RUDOLF F. WEIL Patented Nov. 18, 1952

2,618,078

UNITED STATES PATENT OFFICE 2,618,078

EDUCATIONAL DEVICE

Rudolf F. Weil, Kew Gardens, N. Y.

Application March 11, 1947, Serial No. 733,866
In Switzerland September 3, 1940

Section 1, Public Law 690, August 8, 1946
Patent expires September 3, 1960

2 Claims. (Cl. 35—28)

1

This invention relates to game devices and in particular to educational game devices.

It is one of the objects of this invention to provide means facilitating the reproduction of elemental areas of a picture onto a pattern board on which disk-shaped elements may be arranged and grouped so as to represent a substantially true replica of said picture.

It is another object of the invention to dissect a selected area of a picture and to reproduce picture elements on a pattern board or base in accordance with the original disposition of the selected picture area.

Still a further object of the present invention is to provide a pattern board or base on which disk-shaped elements may be arranged for frictional engagement with said board and for removal therefrom, said disk-shaped elements being preferably made from felt or similar rough-surfaced material having various colors to bring about variations of desired configurations or designs.

Yet, another object of this invention is to provide a device of the aforesaid character which may be used for various purposes in the field of advertising, for educational or similar purposes, and which is also applicable to games and the like which may develop and further the aesthetic and artistic abilities of a child or other user.

The invention further contemplates a new method of developing and readily changing configurations or designs by the employment of relatively small elements of any desired shape or form having at least one roughened or otherwise prepared surface which is adapted for engagement with parts of a surface of a pattern or like board and for removal therefrom, which elements adhere to these surface parts in such a manner that the board may be moved even to upside-down position without substantially disturbing the position of the elements placed thereon.

These and other objects are accomplished and this invention accordingly consists of the features of construction, combination of parts and in the unique relations of the members and in the relative proportioning and disposition thereof as appearing on the attached drawing which illustrates an embodiment thereof. This embodiment is shown for the purpose of illustrating the invention, although it is to be understood that the various parts of which the invention consists can be variously arranged and organized and that the invention is not limited to the precise arrangement and organization of the instrumentalities as herein shown and described.

2

In the drawing:

Fig. 1 is a top plan view of a picture to which a transparent dissecting sheet or divider is applied, the latter being lifted at one corner thereof;

Fig. 2 illustrates spaced apart, disk-shaped elements provided with hatchings to indicate different colors, and employable with this invention;

Fig. 3 is a top plan view of a pattern board having a predetermined field to which elements, as seen in Fig. 2, have been applied;

Fig. 4 is an enlarged sectional view through one of the disk-shaped elements in engagement with the pattern board.

Referring now more particularly to the drawing, there is disclosed in Fig. 1 a base or sheet 10 carrying a picture 11.

Let it be assumed that this picture 11 is to be reproduced in accordance with this invention. To this end, a transparent sheet-like member 12 made from glass, celluloid or similar material, which is adapted to divide or dissect the picture 11 is placed on the latter in superposed position. This transparent member 12 is provided with a screen-shaped formation 13 comprising in the present instance circular fields 14 which are arranged in close proximity to each other, as it is shown in Fig. 1.

Marginal numerals, such as 1, 2, 3 etc. appear on the horizontal as well as on the vertical frame strips 15, 16, 17 and 18, which numerals facilitate determination of the location of picture areas over which the respective circular fields are positioned. Thus, for example, the elemental area 20 of the picture 11 may be identified to be located within the horizontal space extending from the numeral 2 to the numeral 3 and within the vertical space extending from numeral 5 to numeral 6 of the frame strips; and the location of the picture area 20 can further be determined by the numerals $2^1$ and $5^2$.

Fig. 3 illustrates a board 21 which has a roughened surface 22 (Fig. 4) and to this effect board 21 may consist of cardboard or other suitable paper which has a velvet finish with hair-like particles 22a projecting from said surface 22. Impressed into the surface 22 of board 21 is a raster-shaped formation 23 which is identical with or substantially corresponds to the above mentioned formation 13 printed or otherwise provided on the surface of the transparent member 12.

By now using circular shaped elements 24, 25, 26, 27 (Fig. 2) a reproduction of the picture 11 with the same shading may be obtained on board 21. These elements may be variously colored and are preferably made from relatively thin fabric (preferably velvet), paper or other cellulosic material which has the tendency to readily adhere to the velvet-like or roughened surface of board 21. Thus, for instance, the elemental area 20 of picture 11 can be reproduced by element 20a at the same location on board 21 as it appears through transparent member 12, namely, at the location of $2^1$ and $5^2$. Element 20a has hair-like particles 20b projecting from the surface of said element 20a, which particles interengage and interlock with particles 22a of the board surface 22.

Thus, the entire picture 11 may be transferred and reproduced on board 21, as it is well understood.

Instead of providing board 21 with the aforementioned screen-like formation 23, the same may be either entirely omitted or may be varied in accordance with the purpose of the invention.

It is of course understood that the similarly shaped elements may assume other forms and configurations, the main purpose being that corresponding, roughened surfaces of the elements and of the board interengage each other so as to assure a relatively strong attachment and fixation to the surface of the board 21 and for removal therefrom, whereby these elements will not drop down or be displaced when turning board 21 upside down.

If elements of the paper type are employed, such paper should have at least one adhesive surface, whereby the elements may be permanently fixed to the board, if so desired.

The game device made in accordance with this invention may be used for various advertising and educational purposes to outline certain patterns of various color schemes, whereby the aesthetic and artistic abilities of a child or any other user may be enhanced. Instead of using a picture or other design configuration, it may be left entirely up to the user to create own designs, etc. by means of the board and the aforesaid elements which may have all the same or dissimilar shapes and colors.

It is further contemplated in accordance with this invention to use elements made from metal foil which may be magnetized and adhere to a base or board which has the tendency to retain these magnetized metal elements.

The elements 24 to 27 may also be manufactured with a luminous paint surface to obtain glowing and other color effects. It is, however, to be kept in mind that the contiguous surfaces of the elements and of the board should be interengageable or adherent to and for ready removal from each other.

In the case of using felt elements and a board having a velvet-like surface, the projecting or extending fibrous particles of the surfaces of the elements and the board interlock and result in an efficient and tight connection, which may be easily accomplished by pressing such elements onto said velvet-like surface by the hand of the user.

It can thus be seen that there has been provided in accordance with this invention a game or like device comprising a base having a roughened, fibrous surface, a plurality of elements made of fibrous material and including each particles projecting beyond the surface of said elements, and a raster-shaped formation on said base surface, said elements being adapted for position on said base surface to which they adhere by pressing said elements with their projecting particles onto said base surface, said raster-shaped formation including fields corresponding to the size of said elements, respectively.

As many possible embodiments may be conceived of the above invention, and as alterations or changes may be made in the embodiment above set forth, it is to be stated that all matters hereinbefore explained or shown in the accompanying drawing, are to be interpreted as illustrative and not in a limiting sense.

Having thus described the invention, what is claimed as new and desired to be secured by Letters Patent, is:

1. A game device comprising in combination a base carrying a picture, a divider sheet of transparent material including a plurality of fields for position on said base, whereby said picture is dissected into areas corresponding to said fields, a game board provided with a fibrous surface and having incorporated therein fields corresponding to those of said divider sheet, and elements each equal in size and shape in contour corresponding to that of said fields of said divider sheet and of said game board.

2. A game device comprising in combination a base carrying a picture, a transparent divider sheet the surface of said sheet being provided with a screen-shaped formation and for position on said base, whereby said picture is dissected into areas corresponding to said screen-shaped formation, a game board provided with a fibrous surface and having incorporated therein fields corresponding to said screen-shaped formation of said divider sheet, and elements each equal in size and shaped in contour corresponding to that of said screen-shaped formation of said divider sheet and of said game board.

RUDOLF F. WEIL.

REFERENCES CITED

The following references are of record in the file of this patent:

UNITED STATES PATENTS

| Number | Name | Date |
|---|---|---|
| 1,622,229 | Ormiston | Mar. 22, 1927 |
| 1,922,229 | Burke | Aug. 15, 1933 |
| 2,450,127 | Gardener et al. | Sept. 28, 1948 |

FOREIGN PATENTS

| Number | Country | Date |
|---|---|---|
| 220,516 | Switzerland | July 1, 1942 |
| 291,141 | Italy | Dec. 10, 1931 |